United States Patent [19]

Aho, Jr.

[11] Patent Number: 4,947,963
[45] Date of Patent: Aug. 14, 1990

[54] OIL SUPPLY RESERVOIR

[75] Inventor: Wilho V. Aho, Jr., West Palm Beach, Fla.

[73] Assignee: United Technologies Corporation, Hartford, Conn.

[21] Appl. No.: 350,869

[22] Filed: May 11, 1989

[51] Int. Cl.$^5$ .............................................. F16N 17/06
[52] U.S. Cl. ......................................... 184/6; 184/6.2; 60/39.08; 244/135 R
[58] Field of Search ..................... 184/6, 6.2, 6.5, 6.6, 184/6.7, 6.8, 6.11, 108; 244/135 R; 60/39.08

[56] References Cited

U.S. PATENT DOCUMENTS

| | | | |
|---|---|---|---|
| 2,134,903 | 11/1938 | Young et al. | 184/6 |
| 2,483,448 | 10/1949 | Weitzen | 184/6 |
| 2,831,490 | 4/1958 | Shimcock | 244/135 R |
| 2,934,077 | 4/1960 | Whiting | 244/135 R |
| 4,576,001 | 3/1986 | Smith | 60/39.08 |

FOREIGN PATENT DOCUMENTS 2089751 6/1982 United Kingdom .

*Primary Examiner*—Ira S. Lazarus
*Assistant Examiner*—Alan B. Cariaso
*Attorney, Agent, or Firm*—Edward L. Kochey, Jr.

[57] ABSTRACT

Swirl vessel (14) located within oil tank (28) receives return oil (12) and delivers supply oil (10). The vessel is vented (50) to outside the oil tank. Surplus oil continuously drains (36) to the tank (10) interior. Make up oil from the tank is continuously ejected back into the swirl vessel (14) by various make up lines (46, 56, 68, 60) connected to the low pressure zone (49) of swirl inducing nozzles or injectors (18). The apparatus will operate at any attitude.

15 Claims, 5 Drawing Sheets

OIL SUPPLY RESERVOIR

The Government has rights in this invention pursuant to a contract awarded by the Department of the Air Force.

DESCRIPTION

1. Technical Field

The invention relates to oil supply reservoirs for aircraft and in particular to reservoirs which will function at all attitudes.

2. Background of the Invention

Engines in aircraft normally require high quality lubrication which can be achieved only by forced recirculation lubrication systems. This requires a sump reservoir from which the oil is supplied, a pump, and distribution lines throughout the various bearings, and return lines to the sump which may include filters, aerators or other apparatus. There must be sufficient content in the reservoir to supply the oil required to fill the lines during startup and enough to tolerate oil which may be lost to leakage during operation.

Such lubrication systems must also be vented to atmosphere to avoid excess pressure within the lubricating system or a negative pressure which could draw in contaminants.

Many advanced aircraft are required to operate at all attitudes including upside down, and the lubrication must continue throughout these operations. The bearings will only survive a very short time if the lubrication system is not continuously supplying oil.

British Patent Application No. 2089751 shows an oil reservoir operable at all attitudes. Return oil from the exterior equipment is tangentially introduced into a cylindrical chamber forming a vortex. The central portion of the chamber is vented to atmosphere while oil is taken from the periphery of the chamber for the supply oil to the exterior equipment.

The reserve capacity of this system depends on the size of the cylindrical vessel. It is also difficult to determine in operation the quantity of oil remaining in the system and whether the amount is getting dangerously low.

Space within an aircraft is limited and what is available is usually oddly shaped. It is therefore difficult to place a large cylindrical object conveniently within the aircraft.

SUMMARY OF THE INVENTION

An oil swirl vessel for a recirculating oil system permits venting and the supply of oil at all attitudes. The vessel is located within an oil tank where it continuously draws oil from the supply and returns oil by overflow, whereby the entire contents of an odd shaped tank may be utilized as the reserve oil capacity.

The vented oil supply reservoir includes a swirl vessel which has a substantially cylindrical chamber and oil injection nozzles located for projecting return oil into the chamber in a tangential manner. The vent line is located axially within the chamber for venting to atmosphere. An outlet opening is peripherally located within the chamber and is in fluid communication with the oil supply line to the exterior equipment.

This swirl chamber is located within an oil tank and the chamber has a drain opening at one end in fluid communication with the interior of the tank so that excess oil is continuously drained into the tank. Oil make up lines from a multiplicity of locations within the oil tank are connected to the low pressure zone of various injection nozzles. This causes the oil in the sump to be continuously injected from the tank into the chamber. Makeup oil is thereby continuously added to the cylindrical chamber and drained therefrom with the equilibrium operation settling out with the vortex size within the chamber dependent on the actual oil level within the tank.

The vent line is vertically serpentine to provide traps to avoid a flow of oil through the vent line at various attitudes and also includes a small vent opening to the interior of the tank.

The oil injectors are of the flat plate type with a vertically elongated substantially rectangular slot whereby all of the return oil may be conveniently placed through these injectors without requiring large diameter injectors. This also provides a small dimension throat whereby pressure recovery is achieved in a relatively small distance.

A disk is located at one end of the annular chamber with a bubble fence surrounding the disk and an annular space between the disk and the bubble fence conveying the excess oil to the drain line. The second annular space outboard of the first annular space collects the oil for supply to the exterior equipment.

DESCRIPTION OF THE PREFERRED EMBODIMENT

Figure 1:
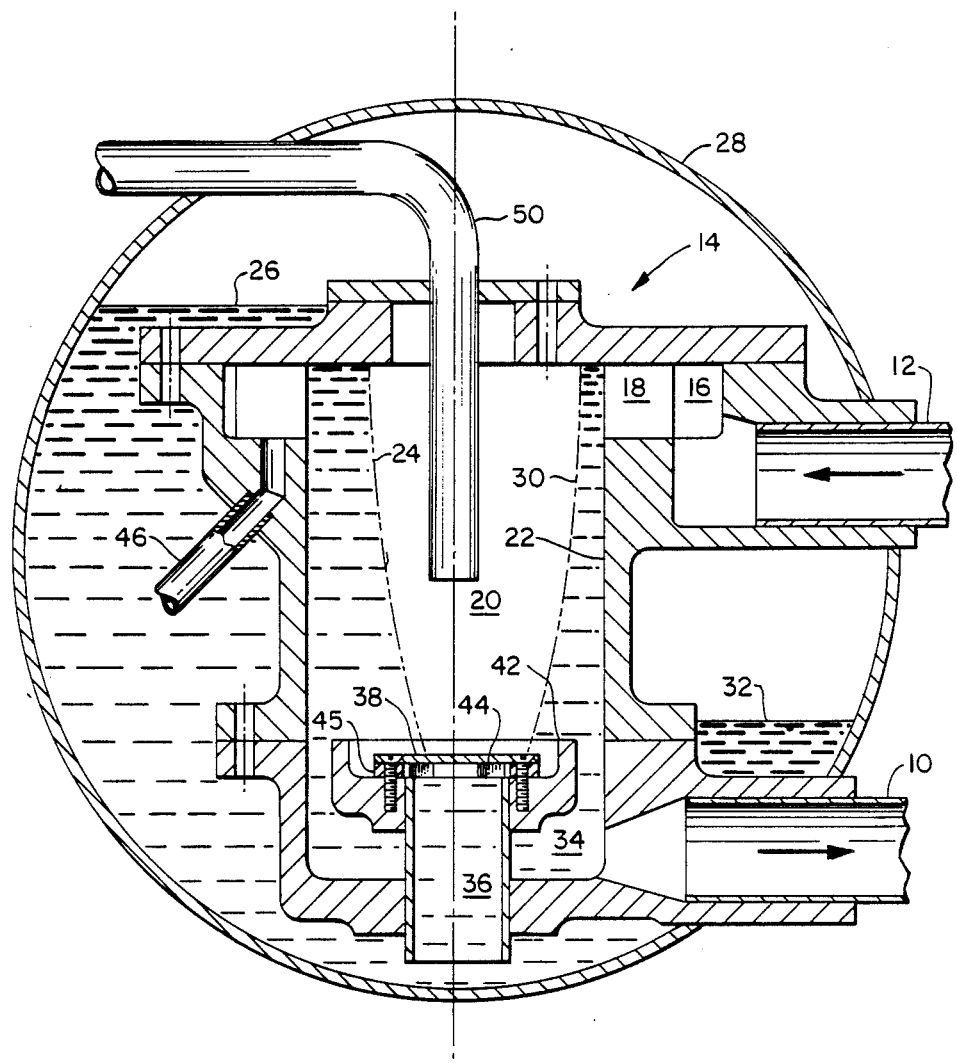
FIG. 1 is a sectional elevation view of the swirl vessel operating at straight level flight.
Figure 2:
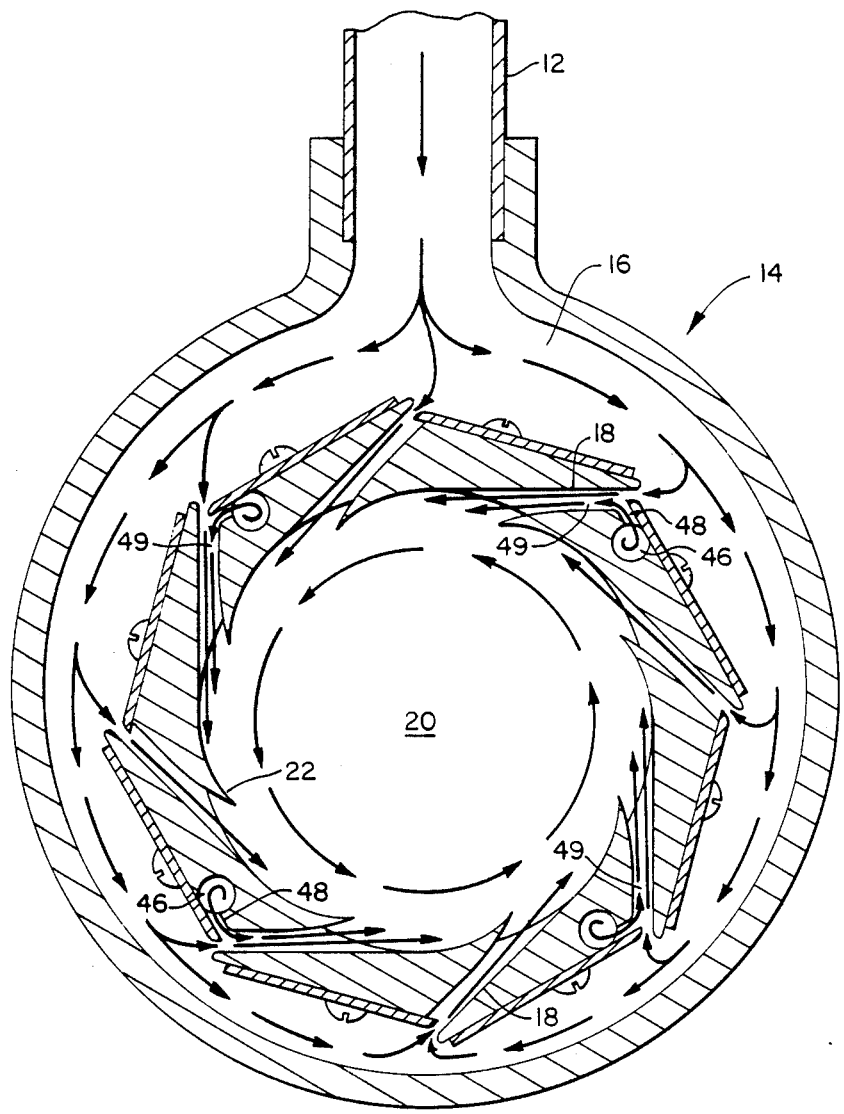
FIG. 2 is a sectional plan view showing the injectors.

Exterior to the equipment shown there is an oil pump receiving oil from supply line 10 for supply to an engine and equipment treating the oil which is then returned through return line 12. This oil enters the swirl vessel 14 and passes to an annular inlet 16 (FIG. 2) where it is distributed around the circumference. The oil then passes through a plurality of flat plate injectors 18 and directed tangentially into a substantially cylindrical chamber 20 having a chamber wall 22.

This oil forms a free vortex surface 24 with a high level 26 in oil tank 28, or vortex surface 30 with low level 32 in oil tank 28. The oil supply is taken from annular space 34 through supply line 10.

A centrally located swirl vessel drain 36 permits excess oil to drain into the interior of tank 28. A centrally located disk 38 is supported above the outlet with a first annular space 40 between the disk and the vertically extending cylindrical bubble fence 42. The excess oil passes inwardly from the space 40 through a substantially annular opening 44 between the disk 40 and the support ring 45, then draining through the drain line 36 back to the oil tank 28.

The disk facilitates the maintenance of a clean vortex surface while the bubble fence minimizes the amount of air bubbles that are carried outwardly to the supply line 10.

A plurality of make up lines 46 are in fluid communication with the interior of oil tank 28 at various locations. These continue upwardly adjacent to the flat plate ejector nozzles where they are in fluid communication by opening 48 with the low pressure zone (49) of the injection nozzle. Injection nozzles by their nature provide high velocity at the throat of the nozzle with this high velocity being accompanied by a low static pressure. Therefore, in accordance with conventional theory of injector or ejector nozzles this low pressure zone may be used to eject fluid from outside. Accordingly, the conventional low pressure zone of these injector nozzles is used to obtain the pumping action to draw the make up oil into the cylindrical chamber. Thus, the make up oil continually flows into the chamber and any excess brought therein passes through the drain line. The chamber thereby operates at an equilibrium condition with its contents dictated by the actual level of the oil with the tank 28.

It follows that during normal level flight operation the level in oil tank 28 may be measured to determine whether or not there is sufficient oil within the system.

Vent line 50 is located with its opening on a the central axis of the swirl chamber 20 and the opening is preferably located near the vertical midpoint of the chamber. This vent line 50 passes to atmosphere so as to provide appropriate venting of the oil lubricating system.

Figure 5:
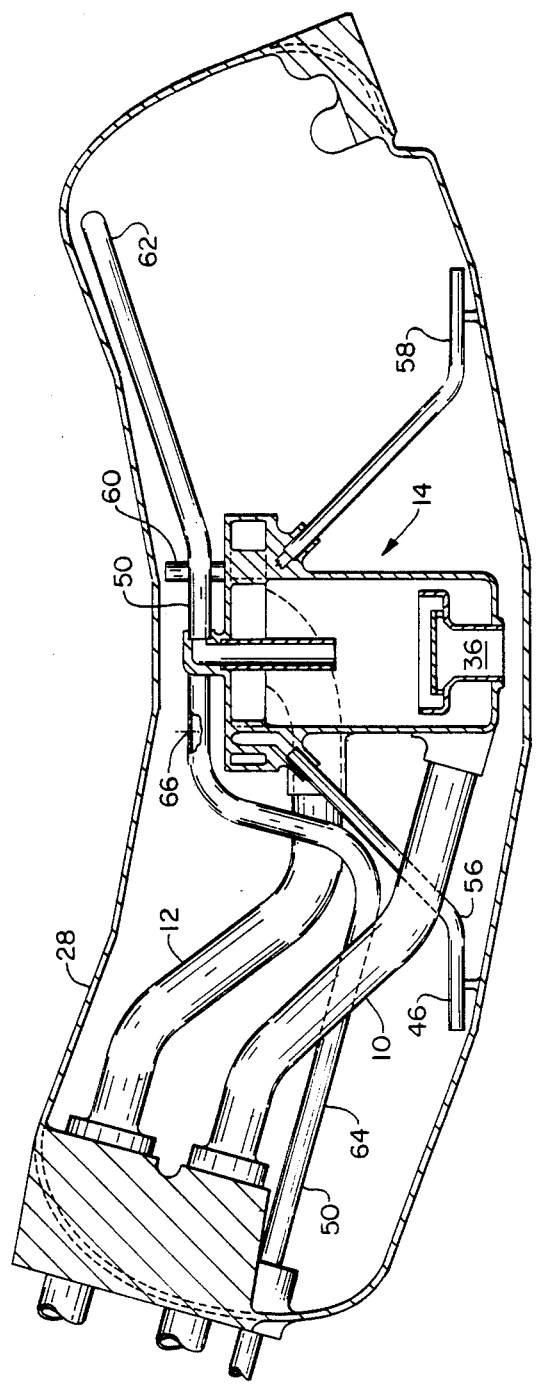
FIG. 5 is a sectional elevation of a tank containing the swirl vessel.

This vent line is discussed further in conjunction with the later description of the installed system as illustrated in FIG. 5.

Figure 3:
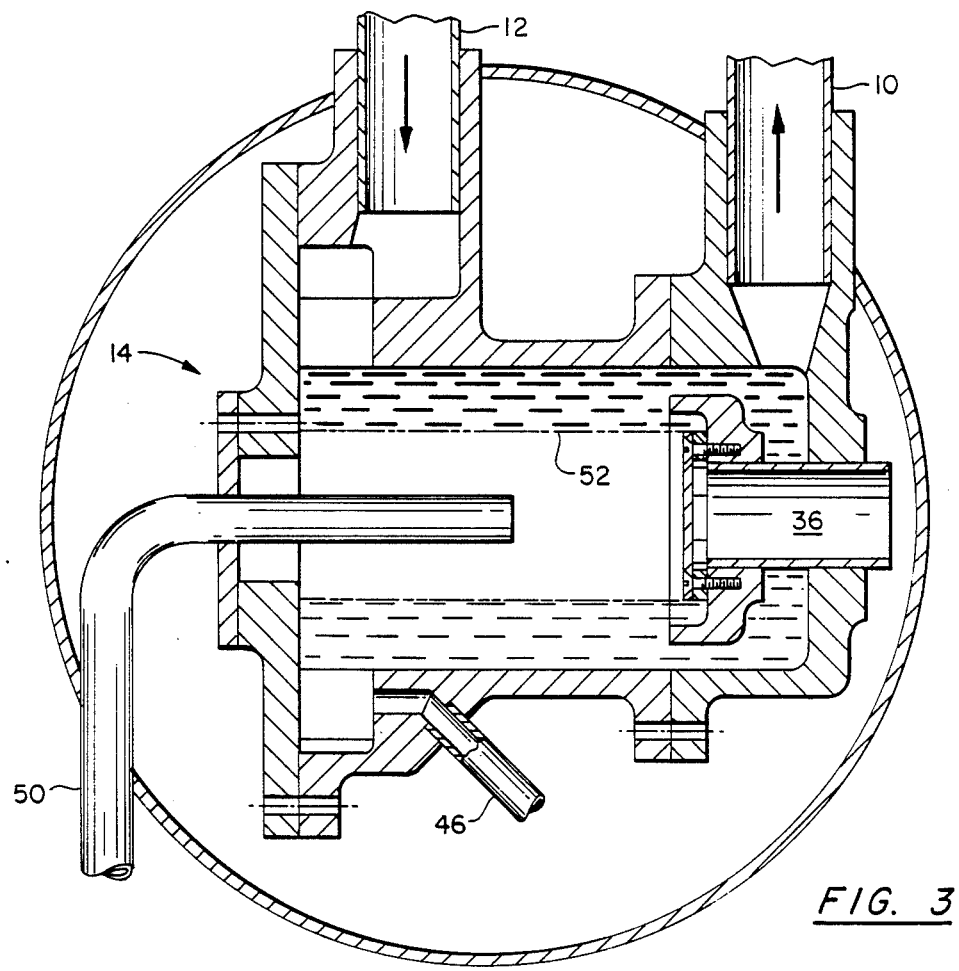
FIG. 3 is a sectional elevation of the swirl vessel operating at knife edge flight.

FIG. 3 illustrates knife edge operation of the oil swirl vessel 14 when the aircraft is flying in the so called knife edge condition. With such operation the inner vortex surface 52 is substantially cylindrical in shape with the ejection of make up oil through make up line 46 and the discharge of excess oil through drain 36 continuing.

Figure 4:
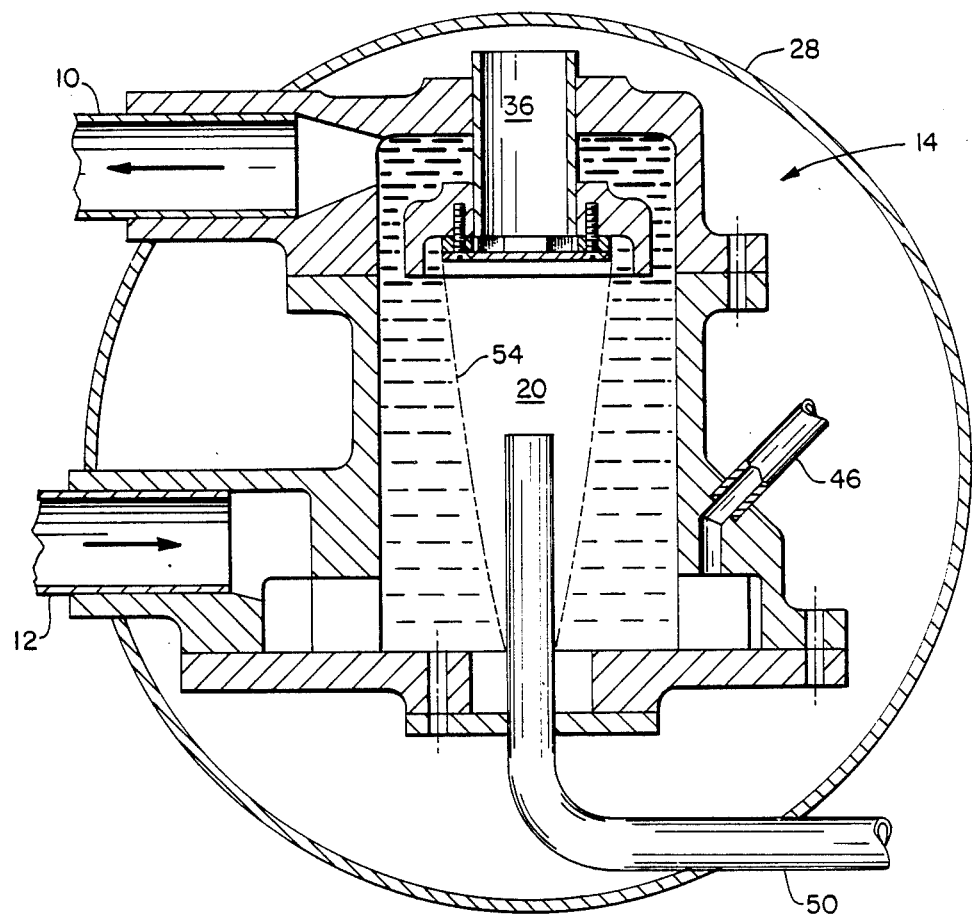
FIG. 4 is a sectional elevation of the swirl vessel operating at inverted flight.

FIG. 4 illustrates the inverted flight condition where vortex surface 54 is formed. Ejection of make up oil continues through line 46 provided that the particular line 46 has its other end at a location is under the oil level within tank 28 in this condition. The vent line 50 is still in communication with the center of the vortex to provide venting to atmosphere while the drain 36 is now located at the top. Accordingly, additional make up oil would build up within the vortex chamber 20 until the excess oil was able to pass upwardly through the drain 36.

FIG. 5 illustrates the swirl vessel 14 located within the oil tank 28. Oil return line 12 and oil supply line 10 are also shown. The plurality of oil make up lines 46 are shown with line 56 on the bottom lefthand side and line 58 on the bottom righthand side. Also illustrated is line 60 which is located near the top of the tank which would fulfill the function of supplying make up oil during inverted operation.

Vent line 50 has a vertically serpentine traverse passing out with return loop 62 in the upper righthand side and continuing through section 64 on the lefthand side. These vertical undulations provide for the formation of oil and air pockets during the various attitudes to avoid an inadvertent drainage of oil from the tank. Small diameter holes 66 are located in the vent line as a vent to the interior of the tank. This provides egress for any air which is drawn into the vortex during normal operation to minimize the amount of vacuum on the tank which is drawn by the ejectors.

What is claimed:

1. A vented oil supply reservoir for an aircraft comprising:
   an oil supply line to exterior equipment;
   an oil return line from exterior equipment;
   a swirl vessel including a substantially cylindrical chamber having an axis, oil injection nozzles in fluid communication with said oil return line for projecting oil into said chamber in a tangential manner, an axially located vent line within said cylindrical chamber in fluid communication with the interior of said chamber, and an outlet opening peripherally located within said cylindrical chamber in fluid communication with the said oil supply line;
   an oil tank;
   said swirl vessel located within said oil tank;
   a drain opening at one end of said cylindrical chamber in fluid communication with the interior of said oil tank;
   said vent line in fluid communication with the exterior of said oil tank; and
   at least one oil make up line in fluid communication with the interior of said oil tank and with a low pressure zone of said injection nozzles.
2. An apparatus as in claim 1:
   said vent line traversing a vertically serpentine path.
3. An apparatus as in claim 2:
   said vent line also having at least one small vent opening to the interior of said tank.
4. An apparatus as in claim 3:
   the end of said vent line within said cylindrical chamber being located at approximately the midpoint vertically within said chamber.
5. An apparatus as in claim 4:
   a plurality of oil make up lines; and
   said oil make up lines having inlet openings at various locations within said oil tank.
6. An apparatus as in claim 5:
   at least one of said oil make up lines having an inlet opening near the top of said oil tank.
7. An apparatus as in claim 6:
   each of said oil injection nozzles of the flat plate type having a vertically elongated substantially rectangular flow opening.
8. An apparatus as in claim 7:
   said cylindrical chamber having a bounding wall; and
   each of said oil injection nozzles directed tangentially to said wall.
9. An apparatus as in claim 8:
   said injection nozzles located at one end of said cylindrical chamber; and
   said outlet opening located at the opposite end of said chamber.
10. An apparatus as in claim 9:
    an annular disk centrally located within said cylindrical chamber and adjacent to the lower end thereof;
    a first annular space between said disk and the wall of said cylindrical chamber in series flow relationship with said drain opening.
11. An apparatus as in claim 10:
    a bubble fence comprising an upwardly standing ring surrounding said first annular space at the elevation of said disk and extending slightly upwardly therefrom.
12. An apparatus as in claim 11:
    said outlet opening including a second annular space outwardly of said bubble fence.
13. An apparatus as in claim 1:
    said vent line also having at least one small vent opening to the interior of said tank;

a plurality of oil make up lines;
said oil make up lines having inlet openings at various locations within said oil tank;
at least one of said oil make up lines having an inlet opening near the top of said oil tank.

14. An apparatus as in claim 13:
each of said oil injection nozzles of the flat plate type having a vertically elongated substantially rectangular flow opening;
said injection nozzles located at one end of said cylindrical chamber; and
said outlet opening located at the opposite end of said cylindrical chamber.

15. An apparatus as in claim 14:
an annular disk centrally located within said cylindrical chamber and adjacent to the lower end thereof;
a first annular space between said disk and the wall of said cylindrical chamber in serious flow relationship with said drain opening;
a bubble fence comprising an upwardly standing ring surrounding said first annular space at the elevation of said disk and extending slightly upwardly therefrom; and
said outlet opening including a second annular space outwardly of said bubble fence.

* * * * *